United States Patent [19]

Luettgert et al.

[11] Patent Number: 4,988,160
[45] Date of Patent: Jan. 29, 1991

[54] METHOD FOR FIXING OPTICAL WAVEGUIDES IN A CONNECTOR HOUSING

[75] Inventors: Karl-Ernst Luettgert; Klaus Schulz, both of Berlin, Fed. Rep. of Germany

[73] Assignee: Siemensaktiengesellschaft, Berlin & Munich, Fed. Rep. of Germany

[21] Appl. No.: 434,238

[22] Filed: Nov. 13, 1989

[30] Foreign Application Priority Data

Nov. 14, 1988 [DE] Fed. Rep. of Germany ....... 3838974

[51] Int. Cl.$^5$ .............................................. G02B 6/36
[52] U.S. Cl. .................................................. 350/96.20
[58] Field of Search ................. 350/96.20, 96.21, 96.22

[56] References Cited

U.S. PATENT DOCUMENTS 4,362,356 12/1982 Williams et al. ................. 350/96.20
4,447,121 5/1984 Cooper et al. .................... 350/96.20
4,458,983 7/1984 Roberts ............................. 350/96.20
4,681,398 7/1987 Bailey et al. ...................... 350/96.20

FOREIGN PATENT DOCUMENTS 861510 of 0000 Fed. Rep. of Germany .

Primary Examiner—John D. Lee
Assistant Examiner—Phan T. Heartney
Attorney, Agent, or Firm—Kenyon & Kenyon

[57] ABSTRACT

A method for securely fixing optical waveguide leads to a connector includes particular steps to ensure that the connection between the connector and the waveguide leads is reliable. First, a winching procedure is utilized before attaching the waveguide lead containing cable to the connector. The winching procedure removes any excess length, i.e., slack, in the cable components that are used to absorb high tension stress. In the second step, after inserting the optical waveguide leads in an elastic positioning member and compressing the positioning member to arrest the leads and thereby form crescent-shaped cavities between the waveguide leads and the positioning member, the cavities are filled with a quick-hardening glue.

6 Claims, 2 Drawing Sheets

METHOD FOR FIXING OPTICAL WAVEGUIDES IN A CONNECTOR HOUSING

BACKGROUND OF THE INVENTION

The present invention relates to a method for fixing one or more optical waveguide leads in a connector including a bore for receiving the lead(s).

Typically, when fixing optical waveguides in a connector, a positioning member, through which the optical waveguide leads are inserted substantially stress-free, is retained in a bore formed in a bushing disposed in the connector. The leads are arrested in the positioning member with the help of a stopper. More specifically, the stopper is inserted in an opening in the positioning member and between the inner wall of the bushing and lead containing openings formed in the positioning member.

Such a method may be carried out with a known device, such as the device described in German design Pat. No. 86 22 121. However, this device does not always satisfy all the demands which are placed on it. It is important that a device such as this be able to have at least one optical waveguide lead, regardless of the construction of the cable, introduced and securely fixed within the device.

Therefore, there is a need for a process which guarantees a secure fixation of the optical waveguide leads in a connector housing.

SUMMARY OF THE INVENTION

The present invention is directed to a method for fixing optical waveguide leads in a connector that avoids the problems and disadvantages of the prior art. The invention accomplishes this goal with a method including the steps of:
 providing an optical waveguide cable having optical waveguide leads together with elements for transmitting tensile force;
 securing end portions of the elements at the periphery of the cable to a portion of the connector, having a bore therein;
 applying a tensile force to the elements of the optical waveguide cable used for transmitting tensile force;
 providing a positioning member having openings formed therethrough;
 inserting the positioning member in the bore in the connector portion and passing the optical waveguide leads substantially stress-free through the openings;
 compressing the positioning member to secure the waveguide leads therein and to deform the openings so that spaces between the inner wall of each opening and a respective optical waveguide lead are formed; and
 filling the spaces with glue to further secure each optical waveguide lead within a respective opening.

In this process, it is first necessary to remove all the excess length, i.e., slack, in the cable components which absorb the tensile force. Thereafter, care is taken to advantageously first couple each optical waveguide lead to the positioning member in a frictional and/or form-locking manner. This is accomplished by passing each optical waveguide lead through a respective opening in the positioning member. The arresting action which occurs between the positioning member and the inner wall of the bore, as well as between the positioning member and the optical waveguide leads passing therethrough, is achieved by pressing a stopper between the positioning member and the inner wall of the bore. The optical waveguide leads are further secured or arrested in place by applying glue in the spaces between the walls of the positioning member openings and the optical waveguide leads arrested therein. These spaces are the result of deformation that occurs when the stopper compresses the positioning member as the stopper is put in place.

In the illustrated embodiment, the outer circumference of the optical waveguide cable is subjected to a tensile force which is applied with the aid of a winch. Of course, one must ensure that the diameter of the winch does not exceed a critical bending diameter for the cable. In addition, the winch should provide a sufficiently large gripping surface, so that the desired tensile force can be properly applied to the cable.

Also disclosed is the use of a conically-shaped stopper to compress the positioning member and arrest the optical waveguide leads therein. With this conical stopper, it is possible to easily adjust the force and thus the degree of compression acting on the positioning member and to accommodate optical waveguide leads of varying diameter.

DETAILED DESCRIPTION

Figure 1:
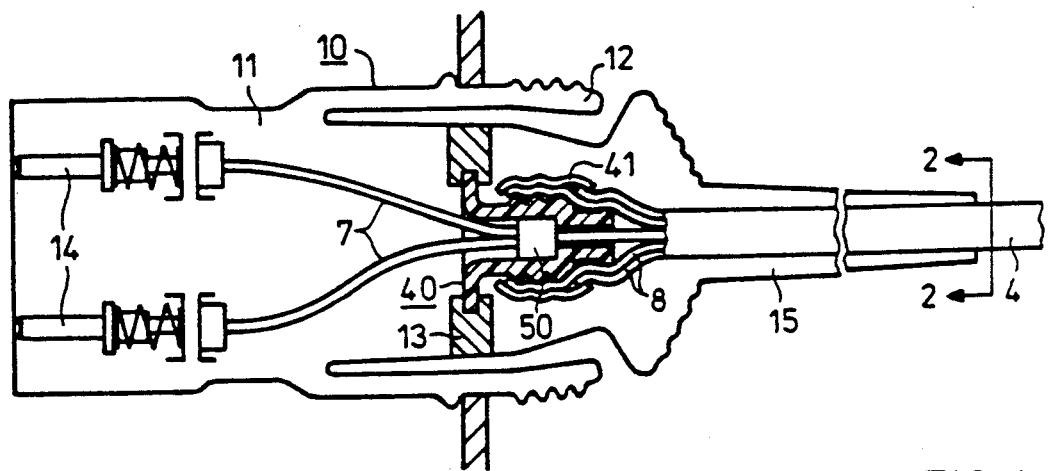
FIG. 1 is a partial cross-sectional view of a connector with a two lead optical waveguide cable according to the principles of present invention.

Referring to the drawings in detail, wherein like numerals indicate like elements, connector device 10 is depicted in FIG. 1. Device 10 comprises housing 11, which includes flexible snap-on tongues 12. Within housing 11, an arresting bushing 40, containing a central bore 42, is secured to stationary partition wall 13. Flexible attachment plugs 14, each of which contains an individual optical waveguide lead 7, also are disposed in housing 11. At the other end of housing 11, optical waveguide cable 4 is introduced therein through a long support sleeve 15. The purpose of this long, flexibly designed support sleeve is to prevent the optical waveguide cable from having too small of a bending radius.

Figure 2:
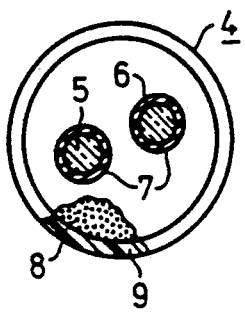
FIG. 2 is a partial cross-sectional view of an optical waveguide cable taken along line 2—2 of FIG. 1.

An example of the structure of optical waveguide cable 4 is shown in a schematic cross-sectional view in FIG. 2. As can be seen from the drawings, sheath 6 surrounds light-conductive fibers 5. In this particular case, optical waveguide cable 4 is illustrated with two optical waveguide leads 7. The optical waveguide leads 7 are surrounded by filaments 8, which together with leads 7 are encased by outer casing 9.

Filaments 8 are designed to withstand high-tensile stress. To this end, filaments 8 consist of aramid fiber in the illustrated embodiment (such that known under the trademark KEVLAR). Initially, optical waveguide leads 7 are passed loosely through the bore in bushing 40. Then, filaments 8, as well as outer casing 9, are secured at the periphery of cable 4 to arresting bushing 40 by means of clamping sleeve 41.

Figure 3:
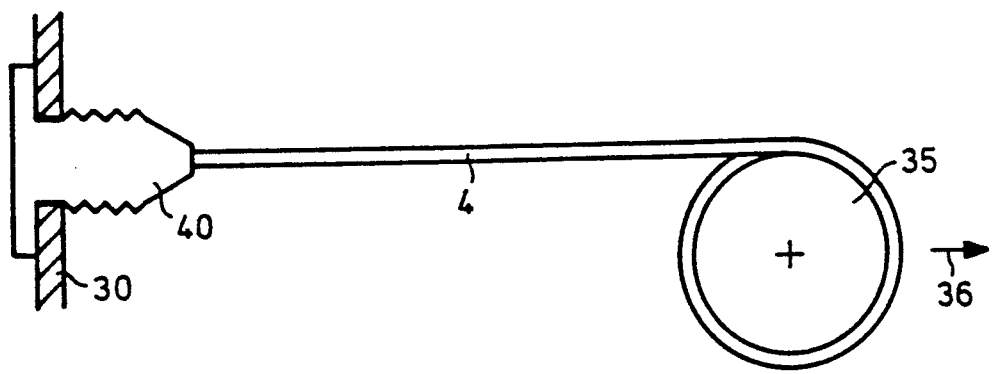
FIG. 3 is a schematic representation of the winching process.

Referring to FIG. 3, the first significant step of the present invention is schematically shown. Specifically, FIG. 3 illustrates the winching and tensioning steps. Arresting bushing 40 is clamped to partition 30, thereby fixing the position of bushing 40. Clamping sleeve 41 (not shown in FIG. 3) secures cable 4 to bushing 40. At a distance approximately equivalent to the breadth of a human being, optical waveguide cable 4 is wrapped several times around winch 35, which is rotated to cause the cable to be acted upon by a specific tensile force, designated by arrow 36. Accordingly, any slack in filaments 8, which resulted from, for example, previous bending of cable 4, is taken-up. Thus, when cable 4 is later subjected to tension, these filaments will effectively absorb the tensile forces that may occur. Accordingly, tensile stress occurring later on will be transferred through filaments 8 to the connector device, while bypassing optical waveguide leads 7.

Figure 4:
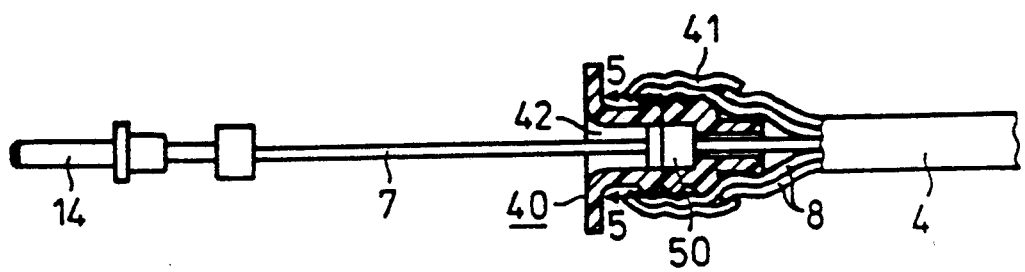
FIG. 4 is a cross-sectional view of the arresting bushing which illustrates the elements associated therewith.
Figure 5:
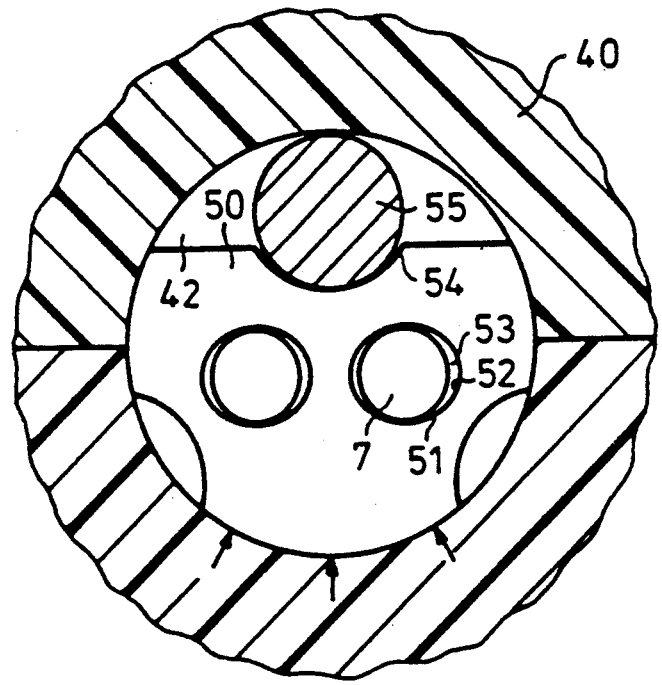
FIG. 5 is a schematic sectional view of the optical waveguide lead positioning member taken along line 5—5 of FIG. 4.

Referring to FIG. 4, arresting bushing 40 includes relatively large bore 42. Bore 42 is dimensioned to receive waveguide lead positioning member 50 which, as shown in FIG. 5, is provided with openings or passageways 51 through which the optical waveguide leads may pass when member 50 is disposed in bore 42.

Positioning piece 50 further includes a further opening or recess 54 for receiving a conical stopper 55. When conical stopper 55 is introduced in bore 42 between recess 54 and the inner wall of bushing 40 it places elastic positioning member 50 under compression and presses the inner walls of openings 51 against optical waveguide leads 7. As a result, optical waveguide leads 7 are arrested or secured in position to a certain degree. Furthermore, when stopper 55 is inserted between the bushing and the positioning member, openings 51 become slightly deformed due to the elasticity of positioning member 50. Accordingly, more or less crescent-shaped cavities or spaces 53 develop between a compressed optical waveguide lead and the inner wall 52 of a respective opening. Then, according to another significant step of the present invention, these cavities are filled with quick-hardening glue.

What is claimed is:

1. A method for fixing optical waveguide leads in a connector, having a bore for receiving the leads, comprising the steps of:
   providing an optical waveguide cable including optical waveguide leads together with elements for transmitting tensile force;
   securing end portions of said elements at the periphery of the cable to a portion of said connector having a bore therein;
   applying a tensile force to said elements of said optical waveguide cable used for transmitting tensile force;
   providing a positioning member having openings formed therethrough;
   inserting said positioning member in the bore in said connector portion and passing said optical waveguide leads through substantially stress-free said openings;
   compressing said positioning member to secure said waveguide leads therein and to deform said openings so that spaces between the inner wall of each opening and a respective optical waveguide lead are formed; and
   filling the spaces with glue to further secure each optical waveguide lead within a respective opening.

2. The method of claim 1 wherein said force applying step comprises wrapping a portion of said cable around a winch and applying said force through said winch.

3. The method of claim 1 wherein said compressing step comprises compressing said positioning member by forcing a stopper element in said bore adjacent to said positioning member.

4. The method of claim 3 wherein said compressing step comprises forcing a conically-shaped stopper element in said bore adjacent to said positioning member.

5. The method of claim 4 wherein said force applying step comprises wrapping a portion of said cable around a winch and applying said force through said winch.

6. The method of claim 1 wherein said steps of end portion securing tensile force applying, positioning member providing, positioning member inserting and optical waveguide passing are carried out sequentially.

* * * * *